United States Patent
Chou (10) Patent No.: US 7,547,883 B2
(45) Date of Patent: Jun. 16, 2009

(54) SEEK-SCAN PROBE (SSP) MEMORY INCLUDING MECHANISM FOR TRACK CORRECTION

(75) Inventor: Tsung-Kuan Allen Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 11/731,304

(22) Filed: Mar. 30, 2007

(65) Prior Publication Data

US 2008/0237755 A1   Oct. 2, 2008

(51) Int. Cl.
*G21K 7/00* (2006.01)
(52) U.S. Cl. ...................................... 250/306
(58) Field of Classification Search ................. 250/306, 250/307; 73/105
See application file for complete search history.

(56) References Cited

U.S. PATENT DOCUMENTS 6,995,368 B2 * 2/2006 Wen et al. .................... 250/306
7,176,457 B2 * 2/2007 Wen et al. .................... 250/306
2008/0148879 A1 * 6/2008 Chou ......................... 73/866.5

* cited by examiner

*Primary Examiner*—Kiet T Nguyen
(74) *Attorney, Agent, or Firm*—Fakely, Sokoloff, Taylor & Zafman LLP (57) ABSTRACT

An apparatus comprising a substrate having one or more anchors formed thereon; a movable platform suspended by one or more tether beams from the one or more anchors; an actuator coupled to the movable platform; and a micro-electro-mechanical (MEMS) probe having a proximal end, a distal end and a longitudinal axis extending between the proximal end and the distal end, wherein the proximal end is coupled to the movable platform and the distal end can be actuated in a direction substantially normal to a surface of the substrate. A process comprising forming one or more anchors on a substrate; suspending a movable platform by one or more tether beams coupled to the one or more anchors; coupling an actuator to the movable platform; and coupling a micro-electro-mechanical (MEMS) probe to the movable platform, the MEMS probe having a proximal end, a distal end and a longitudinal axis extending between the proximal end and the distal end, wherein the proximal end is coupled to the movable platform and the distal end can be actuated in a direction substantially normal to a surface of the substrate.

19 Claims, 6 Drawing Sheets

Fig. 6 ured vertically, these two elements can be used for only very limited and localized correction of track error. In a worst case, only one cantilever can be used at a time. This will drastically limit the data rate and thus result in very poor device performance.

SEEK-SCAN PROBE (SSP) MEMORY INCLUDING MECHANISM FOR TRACK CORRECTION

TECHNICAL FIELD

The present invention relates generally to seek-scan probe (SSP) memories and in particular, but not exclusively, to SSP memories including micro-electro-mechanical (MEMS) probes having mechanisms for track correction.

BACKGROUND

Seek-scan probe (SSP) memories are a type of memory that uses non-volatile storage media as the data storage mechanism and offers significant advantages in both cost and performance over conventional charge-storage memories. Typical SSP memories include storage media made of materials that can be electrically switched between two or more states having different electrical characteristics such as resistance, polarization dipole direction, or some other characteristic.

SSP memories are written to by passing an electric current through the storage media or applying an electric field to the storage media. Passing a current through the storage media, or applying an electric field to the media, is typically accomplished by applying a voltage between a sharp probe tip on one side of the storage media and an electrode on the other side of the storage media. Current SSP memories use probe tips positioned on a free end of one or more MEMS probes. In an idle state each MEMS probe maintains the probe tip at a certain distance from the storage media, but before the electric field or current can be applied to the storage media the probe tip must usually be brought close to, or in some cases in direct contact with, the storage media.

Figure 1A:
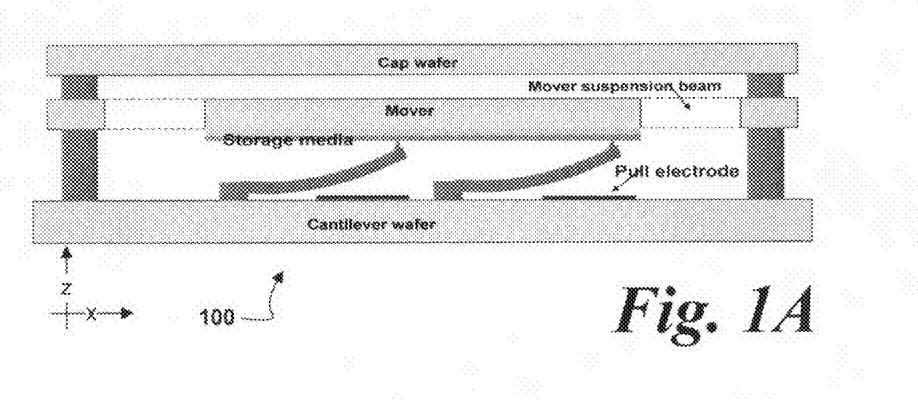
FIG. 1A is a side elevation of an embodiment of a seek-scan probe (SSP) memory.
Figure 1B:
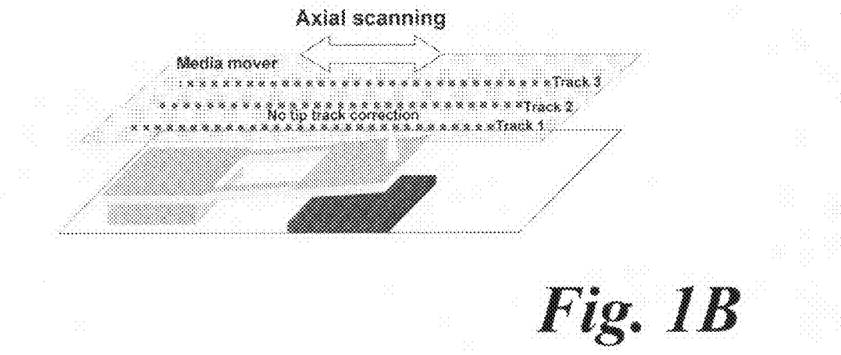
FIG. 1B is a perspective view illustrating axial scanning in the embodiment of an SSP memory shown in FIG. 1A.
Figure 1C:
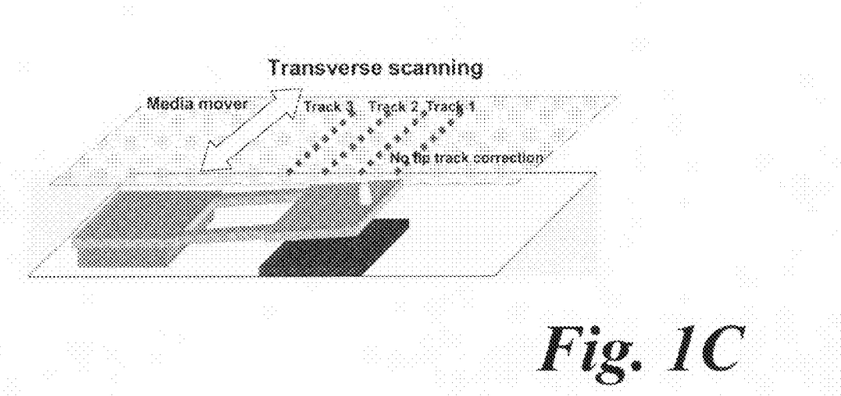
FIG. 1C is a perspective view illustrating transverse scanning in the embodiment of an SSP memory shown in FIG. 1A.

FIGS. 1A-1C illustrate tracking in a common SSP memory configuration. FIG. 1A illustrates an SSP memory configuration in which a cantilever probe is anchored to a substrate (the cantilever wafer), and can be actuated to contact or de-contact the storage media on a mover that carries a storage media and is positioned over the cantilever wafer. The data tracks are stored in the storage media in one of two ways, depending on how the media mover scans relative to the cantilever tips. FIG. 1B illustrates axial scanning, where data is stored in the storage media in-line with the cantilever direction, such that the mover scans in the direction parallel to a longitudinal axis of the cantilever to read/write/erase (R/W/E) each data track. FIG. 1C illustrates transverse scanning, where the media mover scans in a direction perpendicular to the longitudinal axis of the cantilever probe to R/W/E each data track; data is consequently stored in lines that are transverse to the cantilever's longitudinal axis.

To maximize the amount of data that can be written in the storage media the data density should be very high, meaning that the data tracks in the storage media—whether axial or transverse—can be very close together (e.g., <20 nm). During axial or transverse media mover data scanning, the data track will drift differently due to various factors such as temperature change from environment. Furthermore, the localized temperature gradient generated by surrounding electronics can also cause significant data track drift. As a result the cantilever could perform incorrect data streaming on the wrong tacks (e.g., it could intend to R/W/E on track #1, but instead R/W/E on track #3 instead of track #1) and thus cause data errors. Since the mover can only correct the scanning globally and the cantilever can only be actuated vertically, these two elements can be used for only very limited and

BRIEF DESCRIPTION OF THE DRAWINGS

Non-limiting and non-exhaustive embodiments of the present invention are described with reference to the following figures, which are not drawn to scale unless otherwise indicated and in which like reference numerals refer to like parts throughout the various views unless otherwise specified.

DETAILED DESCRIPTION OF THE ILLUSTRATED EMBODIMENTS

Embodiments of an apparatus, system and process for track correction in seek-scan probe (SSP) memories are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 2A:
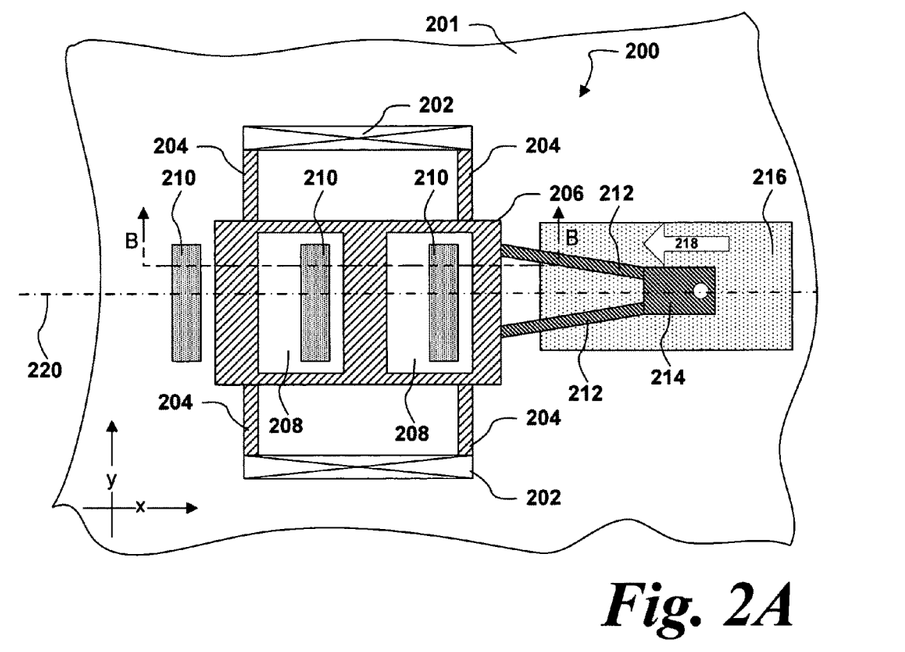
FIG. 2A is a plan view of an embodiment of a scan probe capable of track correction and usable in an SSP memory.
Figure 2B:
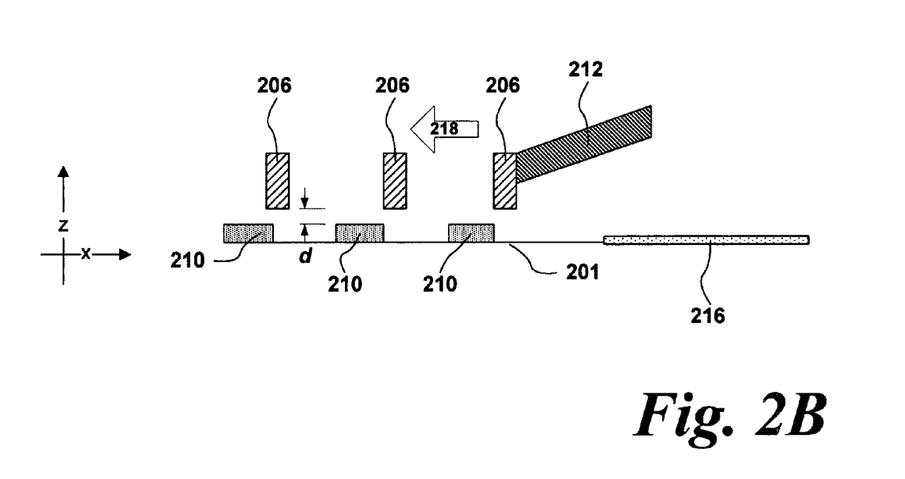
FIG. 2B is a sectional view of the embodiment of a scan probe shown in FIG. 2A, taken substantially along section line B-B in FIG. 2A.

FIGS. 2A and 2B together illustrate an embodiment of a MEMS probe 200 capable of unidirectional axial track correction in an SSP memory. MEMS probe 200 includes a pair of anchors 202 that are formed on (i.e., surface micromachined) or formed in (i.e., bulk micromachined) a substrate or wafer 201. A suspension, in this case made up of four beams 204, is coupled to anchors 202 and to a movable platform 206, such that movable platform 206 is suspended above the surface of substrate 201. A cantilever beam 212/214 is coupled to movable platform 206 and includes a proximal end coupled to movable platform 206 and a free distal end 214 with a tip thereon for reading, writing and erasing in a storage media carried on a media mover (see, e.g., FIGS. 1A-1C). A longitudinal axis 220 of probe 200 is parallel to the centerline of cantilever beam 212/214. Actuation electrode 216 is formed on substrate 201 and exerts a force on cantilever 212 that drives distal end 214 toward and/or away from (in this case, in the +z and −z directions) a media mover that carries the storage media. Similarly, platform actuation electrodes 210 are formed on substrate 201 and exert a force on movable platform 206 that moves the platform in the −x direction, as shown by arrow 218.

Anchors 202 can be formed on substrate 201 using standard micromachining techniques such as photolithographic patterning and etching. Examples of materials that can be used for anchors 202 include polysilicon, single-crystal silicon, silicon germanium ($Si_xGe_y$), other materials not listed here, or combinations of materials.

Each suspension beams 204 is coupled at one end to an anchor 202 and at its other end to movable platform 206. Since the embodiment shown is designed to provide axial track correction for transverse scanning of the media mover (see, e.g., FIG. 1C), suspension beams 204 are designed to have a relatively compliant spring constant in the x direction (e.g., kx=10 N/m) but stiff spring constants in the y and z directions (e.g., ky>>40 N/m and kz≧40 N/m). Beams with a compliant kx allow movable platform 206 to move in an axial direction (e.g., in the −x direction) with adequate displacement (>100 nm) and reasonable low voltage (<40V) for axial track correction in an SSP memory with a transverse-scanning (+y/−y direction) media mover.

Suspension beams with stiff ky and kz ensure stable support to the cantilever beam 212/214. The kz of the movable platform (>40 N/m in one embodiment) is also significantly stiffer than the cantilever's spring constant (kz<0.1 N/m in one embodiment), so that the tip contact force or the cantilever vertical actuation force will not deform the movable platform. As the media mover scans in transverse direction (+y/−y direction), the stiff ky of the suspension beams also provide strong support to the cantilever against tip contact friction. As a result, the cantilever will encounter no significant load difference as compared to fully substrate-anchored cantilevers. To achieve relative compliant kx and stiff kz, thick (e.g., >2 um) and narrow (e.g., 1 um wide) suspension beams can be used; a stiff ky can also be achieved with proper suspension beam design.

Suspension beams 204 can be formed using standard micromachining techniques such as photolithographic patterning and etching. In different embodiments, anchors 202 and formed separately from beams 204 or can be integrally formed with beams 204. Moreover, anchors 202 can be made of the same or different materials as beams 204. Although the illustrated embodiment shows all beams 204 having the same shape and size, in other embodiments all the beams need not have the same shape and/or size, but can instead be individually tailored to provide the required track correction. Examples of materials that can be used for beams 204 include polysilicon, single-crystal silicon, silicon germanium ($Si_xGe_y$), other materials not listed here, or combinations of materials.

Movable platform 206 is coupled to the ends of suspension beams 204 opposite anchors 202, such that movable platform 206 is suspended above the substrate. Movable platform 206 includes a pair of openings 208 that are positioned over platform actuation electrodes 210. A platform actuation electrode 210 is also positioned outside and along an edge of movable platform 206. Movable platform 206 can be formed using standard micromachining techniques such as photolithographic patterning and etching. Although shown with two openings, other embodiments of movable platform 206 can include a greater or lesser number of openings, and the openings need not have the size, shape or orientation shown; still other embodiments can include combinations of openings in different sizes, shapes and orientations. In different embodiments, movable platform 206 can be formed separately from beams 204 or can be integrally formed with beams 204. Moreover, movable platform 202 can be made of the same or different materials as beams 204. Examples of materials that can be used for movable platform 206 include polysilicon, single-crystal silicon, silicon germanium ($Si_xGe_y$), other materials not listed here, or combinations of materials.

The illustrated embodiment uses a surface vernier drive to move the movable platform 206, so that platform actuation electrodes 210 are positioned under openings 208 in movable platform 206. In the configuration shown, one electrode 210 is positioned near movable platform 206 and under each opening 208, although in other configurations there can be more than one electrode under each opening or there can be openings under which there is no electrodes. As described above, the number of openings 208 in movable platform 206 can vary, and the number of platform actuation electrodes 210 can vary correspondingly. Platform actuation electrodes 210 can be made of an electrically conductive material; examples include metals, metal alloys, conductive non-metals or semiconductors such as polysilicon, single-crystal silicon, silicon germanium ($Si_xGe_y$), other materials not listed here, or combinations of materials.

Cantilever beam 212/214 has a proximal end coupled to movable platform 206 and a distal end 214 designed to be actuated in a vertical direction (i.e., in the +z or −z) direction. In the embodiment shown, cantilever beam 212 includes two separate beams 212, both of which are coupled to movable platform 206, and distal end 214 to which both beams 212 are also coupled. To make the cantilever beam actuatable in the z direction so that it can come close to or contact the storage media on the media mover (see, e.g., FIGS. 1A-1C), it is designed to be very compliant in z direction. The value of the spring constant kz in the z direction for the cantilever is substantially smaller (e.g., kz<0.1 N/m in one embodiment) that the value of kz for movable platform 206 (e.g., kz≧40 N/m in one embodiment), so that the tip contact force or the cantilever vertical actuation force will not deform the movable platform. In other embodiments, cantilever beam 212/214 can, of course, have a different construction. Examples of materials that can be used for beams 204 include polysilicon, single-crystal silicon, silicon germanium ($Si_xGe_y$), other materials not listed here, or combinations of materials. As with other elements of MEMS probe 200, cantilever beam 212/214 can be formed using standard micromachining techniques.

Actuation electrode 216 is formed on substrate 201 such that it is positioned between the substrate and cantilever beam 212/214. Actuation electrode 216 is formed on the substrate using standard micromachining techniques such as patterning and etching, and the exact size and thickness of actuation electrode 216 will depend on the desired gap between actuation electrode 216 and cantilever 212/214, the voltage to be applied to the actuation electrode, the stiffness of cantilever 212/214 and so forth. Actuation electrode 216 can be made of an electrically conductive material; examples include metals, metal alloys, conductive non-metals or semiconductors such as polysilicon, single-crystal silicon, silicon germanium ($Si_xGe_y$), other materials not listed here, or combinations of materials.

FIG. 2B illustrates the operation of the surface vernier drive used to move movable platform 206 for track correction. Other embodiments can, of course, use different types of actuators to move movable platform 206, such as parallel-plate drives (see, e.g., FIGS. 3A & 3B), comb drives (see, e.g., FIG. 5B), or other types of actuators not listed or shown here. Platform actuation electrodes 210 are formed on substrate 201, and platform 206 is suspended above the substrate, such that there is a distance d in the z direction between the platform actuation electrodes and the bottom surface of movable platform 206.

The force exerted on movable platform 206 by each actuation electrode depends on the voltage applied to the actuation electrode and the separation d. One 25 µm long surface vernier actuation electrode produces less force at 30V with 0.5 µm gap compared to parallel-plate and comb-finger actuation, but the surface vernier actuation requires less lateral actuation area for structure configuration, more parallel actuation electrodes can thus be designed with same space to compensate smaller force produced by each actuation electrode set. Similar to parallel-plate and comb finger actuation configurations, many actuation electrodes can be designed in parallel to increase the total force exerted on the movable platform, depending on the required force and the available design area.

Figure 3A:
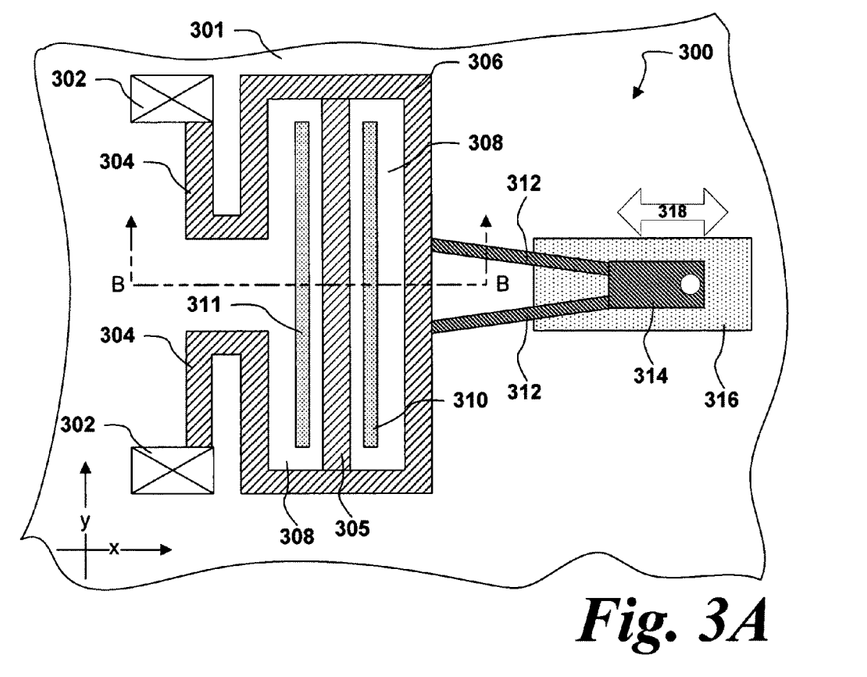
FIG. 3A is a plan view of an alternative embodiment of a scan probe capable of track correction and usable in an SSP memory.
Figure 3B:
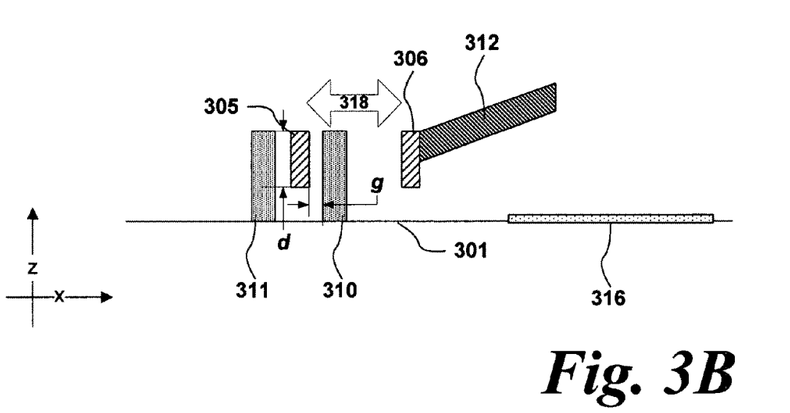
FIG. 3B is a sectional view of the embodiment of a scan probe shown in FIG. 3A, taken substantially along section line B-B in FIG. 3A.

FIGS. 3A and 3B together illustrate an alternative embodiment of a MEMS probe 300 that includes bi-directional axial track correction for use with transverse media mover scanning (see, e.g., FIG. 1C). Bi-directional track correction can substantially increase track correction coverage. MEMS probe 300 uses a parallel-plate drive to create bi-directional tracking motion of the movable platform. MEMS probe 300 includes a pair of anchors 302 that are formed on (i.e., surface micromachined) or formed in (i.e., bulk micromachined) a substrate or wafer 301. A suspension, in this case made up of a pair of beams 304, is coupled to anchors 302 and to a movable platform 306 having a crossbar 305, such that movable platform 306 is suspended above the surface of substrate 301. A cantilever beam 312/314 is coupled to movable platform 306 and includes a proximal end coupled to movable platform 306 and a distal end 314 with a tip thereon for reading, writing and erasing in a storage media carried on a media mover (see FIGS. 1A-1C). Actuation electrode 316 is formed on substrate 301 and exerts a force on cantilever 312 that drives its distal end 314 toward and/or away from (in this case, the +z and −z directions) the storage media. Similarly, platform actuation electrodes 310 are formed on substrate 301 and exert a force on movable platform 306 that moves the platform in the +x and −x directions, as shown by arrow 318.

The elements of MEMS probe 300 can be made using the materials and processes listed above for the analogous elements of probe 200, as well as others not listed. Similarly, the different elements can have different shapes, sizes, proportions, etc, and can be built separately or integrally.

FIG. 3B illustrates the operation of the parallel-plate drive used to move movable platform 306. In MEMS probe 200, actuation electrodes 210 positioned relative to the movable platform to produce unidirectional axial track correction—that is, the movable platform is actuated in one direction only. By contrast, in MEMS probe 300 the platform actuation electrodes can be arranged so that the movable platform can move bi-directionally for axial track correction. A parallel-plate actuation drive is shown in this case. Platform actuation electrodes 310 and 311 are positioned in openings 308 such that they are on both sides of crossbar 305 of movable platform 306. When a voltage is applied to the electrode 310 movable platform 306 will be pulled to the right (i.e., +x direction with compliant kx). Conversely, when a voltage is applied to the electrode 311, movable platform 306 will be pulled to the left (i.e., −x direction with compliant kx).

The magnitude of force applied by platform actuation electrodes 310 on movable platform 306 depends on the voltage applied to the electrodes and on the distances d and g. An actuation electrode 25 µm long and 2 µm high actuation electrode can produce ~0.75 µN force at 30V with 0.5 µm gap. With two or more platform actuation electrodes the device can produce >1.5 µN of force at 30V, which can displace the movable platform by >150 nm with the suspension spring kx of 10 N/m. This displacement is capable of covering five to ten tracks correction. When a stiffer kx is used for beams 304, more actuation electrodes can be design to produce even more electrostatic force to achieve desired displacement.

Figure 4A:
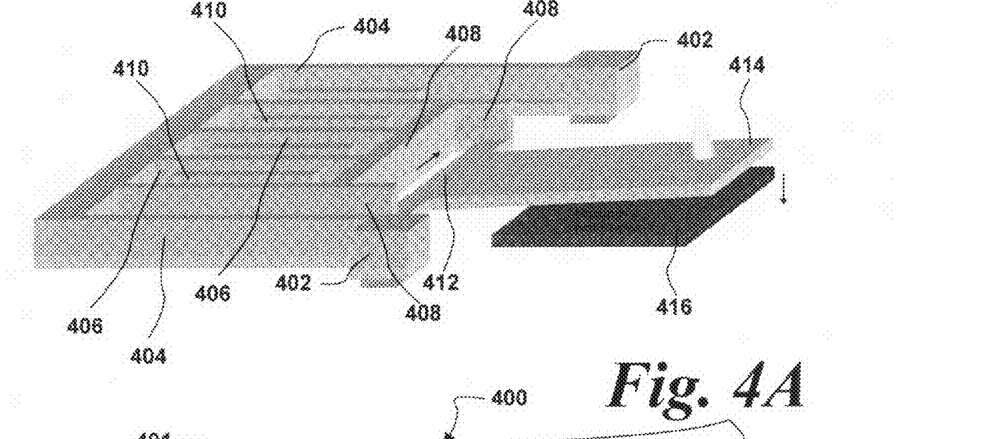
FIG. 4A is a perspective view of another embodiment of a scan probe capable of track correction and usable in an SSP memory.
Figure 4B:
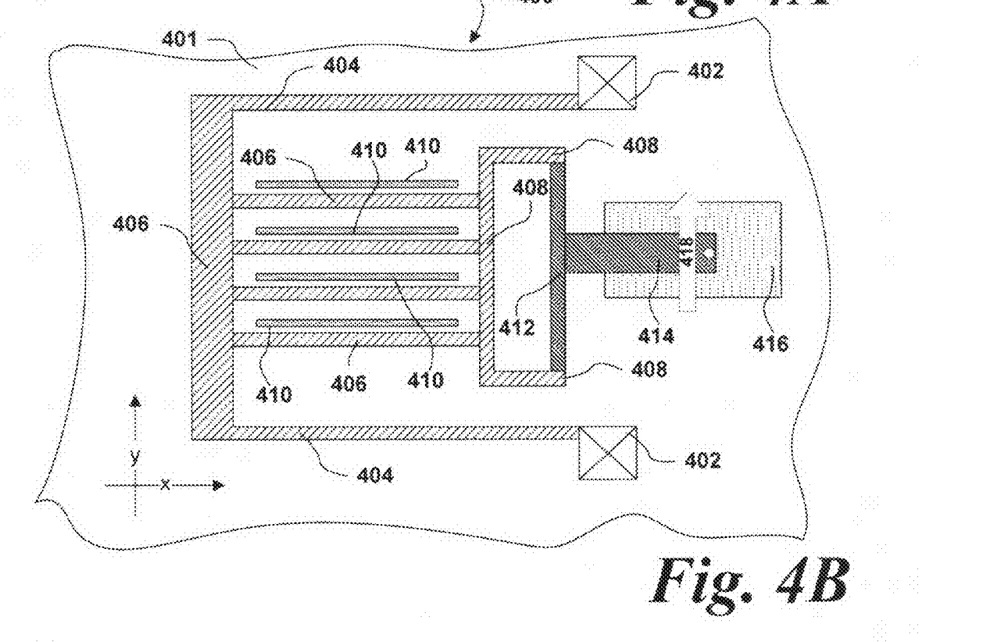
FIG. 4B is a plan view of the embodiment of a scan probe shown in FIG. 4A.

FIGS. 4A and 4B together illustrate an alternative embodiment of a MEMS probe 400 that includes unidirectional transverse track correction for an SSP memory with axial scanning (see FIG. 1B). MEMS probe. 400 uses a parallel-plate drive to create bi-directional tracking motion of the movable platform. MEMS probe 400 includes a pair of anchors 402 that are formed on (i.e., surface micromachined) or formed in (i.e., bulk micromachined) a substrate or wafer 401. A suspension, in this case made up of a pair of beams 404, is coupled to anchors 402 and to a movable platform 406, such that movable platform 406 is suspended above the surface of substrate 401. Movable platform 406 includes a forked end 408, and a torsion beam 412 coupled to both branches of forked end 408 and suspended between them. A cantilever beam 414 includes a proximal end coupled to torsion beam 412 and a distal end with a tip thereon for reading, writing and erasing in a storage media carried on a media mover (see FIGS. 1A-1C). Actuation electrode 416 is formed on substrate 401 and exerts a force on cantilever beam 414 that drives its distal end toward and/or away from (in this case, the +z and −z directions) the storage media. The embodiment shown is configured with a parallel-plate type actuator, so that platform actuation electrodes 410 are formed on substrate 401 and exert a force on movable platform 406 that moves the platform in the +y direction, as shown by arrow 418. In other embodiments different actuators, such as surface vernier drives (see FIGS. 2A-2B) or comb drives (see FIG. 5B), can be used.

Since the embodiment shown is designed to provide transverse track correction for axial scanning of the media mover (see, e.g., FIG. 1B), suspension beams 404 are designed to have a relatively compliant spring constant in the y direction (e.g., ky=10 N/m) but stiff spring constants in the x and z directions (e.g., kx>>40 N/m and kz≧40 N/m). Beams with a compliant ky allow movable platform 406 to move in a transverse direction (e.g., in the +y direction) for axial track correction in an SSP memory with a axial-scanning (+x/−x direction) media mover.

The elements of MEMS probe 400 can be made using the materials and processes listed above for the analogous elements of probe 200, as well as others not listed. Similarly, the different elements can have different shapes, sizes, proportions, etc, and can be built separately or integrally.

Figure 5A:
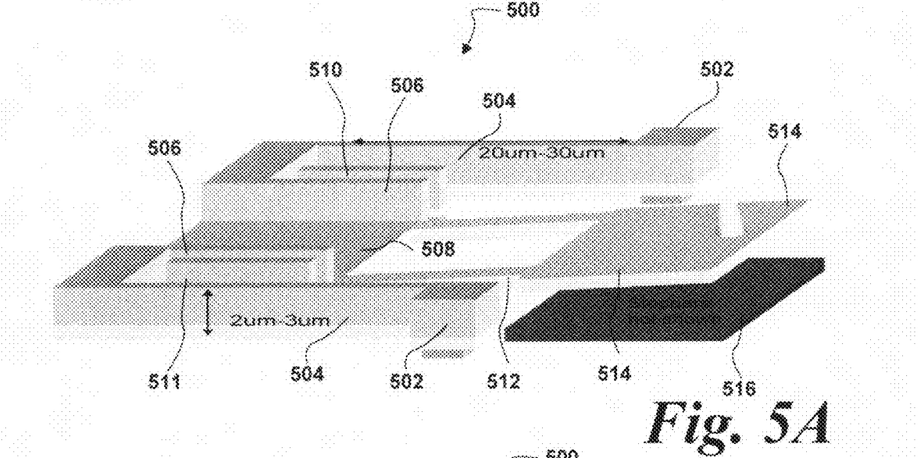
FIG. 5A is a perspective view of yet another embodiment of a scan probe capable of track correction and usable in an SSP memory.
Figure 5B:
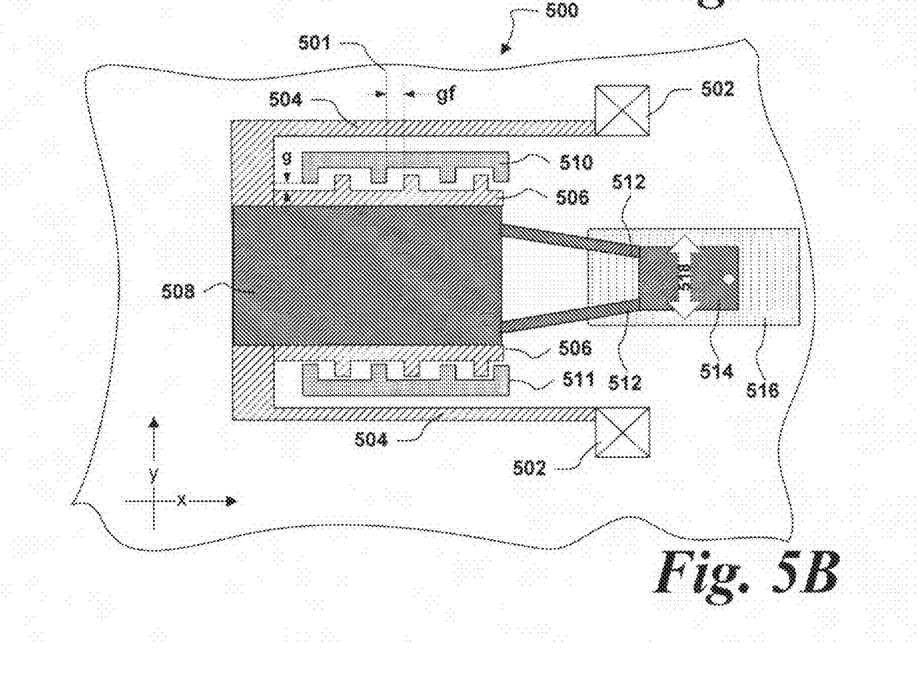
FIG. 5B is a plan view of the embodiment of a scan probe shown in FIG. 5A.

FIGS. 5A and 5B together illustrate an alternative embodiment of a MEMS probe 500 that includes bi-directional transverse track correction that can be used in an SSP memory with axial scanning. MEMS probe 500 uses a parallel-plate drive to create bi-directional tracking motion of the movable platform. MEMS probe 500 includes a pair of anchors 502 that are formed on (i.e., surface micromachined) or formed in (i.e., bulk micromachined) a substrate or wafer 501. A suspension, in this case made up of a pair of beams 504, is coupled to anchors 502 and to a movable platform 506/508 that includes platform 508 and edge combs 506, such that movable platform 506 is suspended above the surface of substrate 501. A cantilever beam 512/514 includes a proximal end with two beams 512 coupled to platform 508 and a distal end with a tip 514 thereon for reading, writing and erasing in a storage media carried on a media mover (see FIGS. 1A-1C). Actuation electrode 516 is formed on substrate 501 and exerts a force on cantilever beam 512/514 that drives distal end 514 toward and/or away from (in this case, the +z and −z directions) the storage media. The embodiment shown is configured with a comb drive actuator, so that platform actuation electrodes 510 and 511 are formed on substrate 501 and exert a force on movable platform 508 through edge combs 506.

The elements of MEMS probe 500 can be made using the materials and processes listed above for the analogous elements of probe 200, as well as others not listed. Similarly, the different elements can have different shapes, sizes, proportions, etc, and can be built separately or integrally.

FIG. 5B illustrates the details of the bi-directional comb drive used in MEMS probe 500. In other embodiments different actuators, such as surface vernier drives (see FIGS. 2A-2B) or comb drives (see FIG. 5B), can be used. Platform actuation electrodes 510 and 511 are formed on substrate 501 and when activated exert a force on movable platform 508 through edge combs 506. When a voltage is applied to the electrode 510 movable platform 506/508 will be pulled upward (i.e., +y direction with compliant ky). Conversely, when a voltage is applied to the electrode 511, movable platform 506/508 will be pulled downward (i.e., −y direction with compliant ky).

The magnitude of force applied by platform actuation electrodes 510 on movable platform 506/508 depends on the voltage applied to the electrodes and on the electrode separation gap g and the comb finger gaps gf. One 25 μm long actuation electrode can produce force of ~0.5 μN at 40V with 0.8 μm lateral gap and 0.3 μm finger gap. When the actuation lateral gap is smaller, the electrode force increases drastically due to contribution from parallel-plate part of the comb finger electrode. In an embodiment with two or more actuation electrodes, the device can produce >1.6 μN of force at 40V, which can displace movable platform 506/508 by >180 nm. As a result, the comb finger driver is capable of achieving lateral correction of >200 nm with finger gap gf<0.3 um with the same electrode thickness and voltage as parallel-plate drive.

Figure 6:
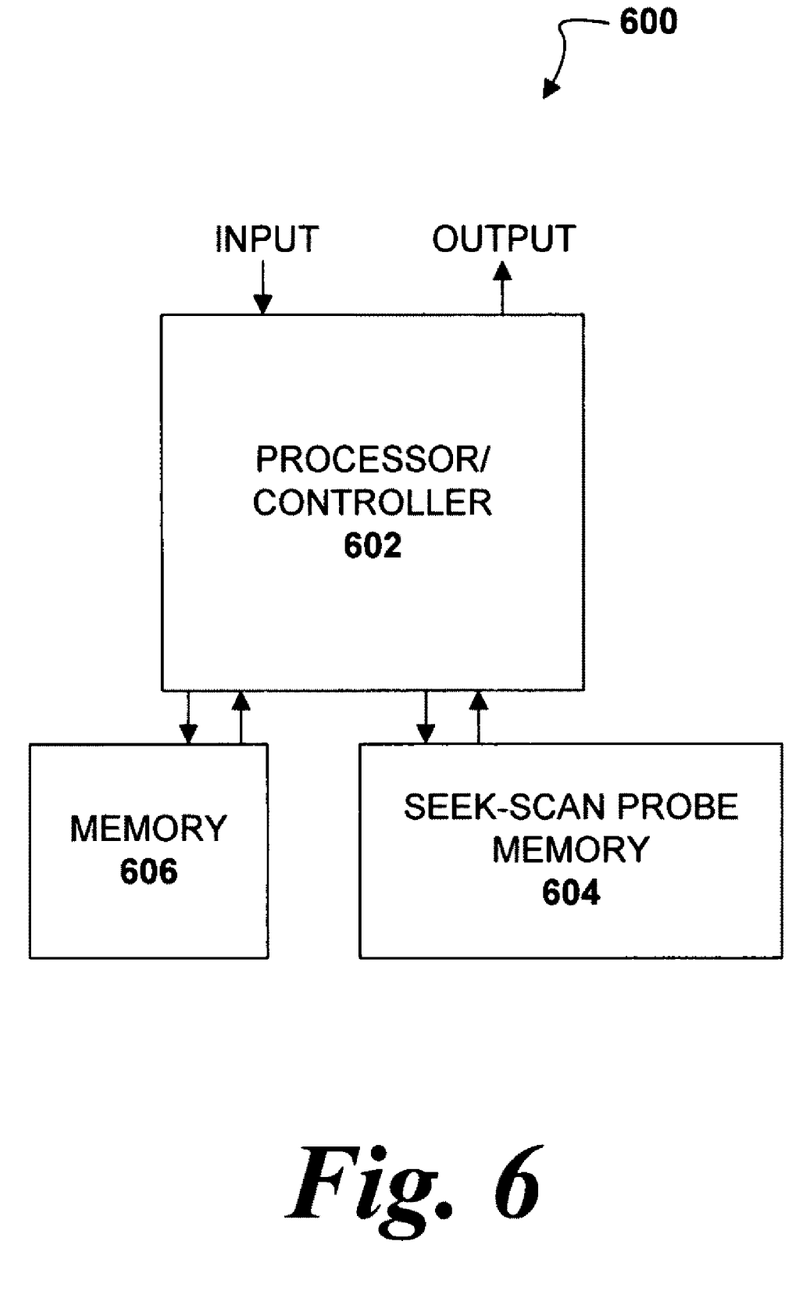
FIG. 6 is a schematic block diagram of an embodiment of a system using one or more embodiments of a phase-change memory such as those shown in FIGS. 2A-2B, 3A-3B, 4A-4B and/or 5A-5B.

FIG. 6 illustrates an embodiment of a system 600 that includes a seek-scan probe (SSP) memory using one or more of MEMS probes 200, 400, 400 or 500. System 600 includes a processor 602 to which are coupled a memory 606 and an SSP memory 604. Processor 602, in addition to being coupled to memories 604 and 604, has an input and an output through which it can receive data and send data, respectively. In one embodiment processor 602 can be a traditional general-purpose microprocessor, although in other embodiments processor 602 can be another type of processor, such as a programmable controller or an application-specific integrated circuit (ASIC).

Memory 606 can be any type of volatile or non-volatile memory or storage. Volatile memories that can be used in different embodiments of memory 606 include random access memory (RAM), dynamic random access memory (DRAM), synchronous random access memory (SRAM) and synchronous dynamic random access memory (SDRAM), erasable programmable read only memory (EPROM), electrically erasable programmable read only memory (EEPROM), and the like. Non-volatile memories that can be used in different embodiments of memory 606 include magnetic and optical disk drives. SSP memory 604 can, in different embodiments, be a memory that includes one or tracking correction MEMS probes 200, 300, 400 or 500.

In operation of system 600, processor 602 can receive and send data through its input and output, and can both read and write data to both the memory 606 and the SSP memory 604. Through appropriate software, processor 602 can control the reading, writing and erasure of data in SSP memory 604 by selectively changing the relevant media property (phase change, electric dipole formation, etc) of the storage media used in the SSP memory.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   a substrate having one or more anchors formed thereon;
   a movable platform suspended by one or more tether beams from the one or more anchors;
   an actuator coupled to the movable platform; and
   a micro-electro-mechanical (MEMS) probe having a proximal end, a distal end and a longitudinal axis extending between the proximal end and the distal end, wherein the proximal end is coupled to the movable platform and the distal end can be actuated in a direction substantially normal to a surface of the substrate.

2. The apparatus of claim 1 wherein the one or more tether beams have a stiffness that is substantially higher in one direction than in others.

3. The apparatus of claim 1 wherein the movable platform can move in one or both of two orthogonal directions in a plane substantially parallel to the surface of the substrate.

4. The apparatus of claim 1, further comprising a media mover supported above the MEMS probe, wherein the media mover can move relative to the substrate in one or both of a direction substantially parallel to the longitudinal axis of the MEMS probe and a direction substantially transverse to the longitudinal axis of the MEMS probe.

5. The apparatus of claim 4 wherein the movable platform can move a tip at or near the distal end of the MEMS probe in a direction substantially normal to the direction of movement of the media mover.

6. The apparatus of claim 5 wherein the movable platform can move the tip a distance approximately equal to or greater than one track spacing.

7. The apparatus of claim 1 wherein the actuator comprises a parallel plate actuator, a comb-finger drive, or a surface vernier drive.

8. The apparatus of claim 1 wherein the MEMS probe comprises a cantilever.

9. A system comprising:
a processor having a first memory coupled thereto, wherein the first memory is selected from a group consisting of random access memory (RAM), dynamic random access memory (DRAM), synchronous random access memory (SRAM) and synchronous dynamic random access memory (SDRAM); and
a second memory coupled to the processor, the second memory comprising:
a substrate having one or more anchors formed thereon,
a movable platform suspended by one or more tether beams from the one or more anchors,
an actuator coupled to the movable platform,
a micro-electro-mechanical (MEMS) probe having a proximal end, a distal end and a longitudinal axis extending between the proximal end and the distal end, wherein the proximal end is coupled to the movable platform and the distal end can be actuated in a direction substantially normal to a surface of the substrate, and
a media mover supported above the MEMS probe and substantially parallel to the surface of the substrate, wherein the media mover moves relative to the substrate in one or both of a direction substantially parallel to the longitudinal axis of the MEMS probe and a direction substantially transverse to the longitudinal axis of the MEMS probe.

10. The system of claim 9 wherein the movable platform can move in one or both of two orthogonal directions in a plane substantially parallel to the surface of the substrate.

11. The system of claim 9 wherein the movable platform can move a tip at or near the distal end of the MEMS probe in a direction substantially normal to the direction of movement of the media mover.

12. The system of claim 11 wherein the movable platform can move the tip a distance approximately equal to or greater than one track spacing.

13. The system of claim 9 wherein the MEMS probe comprises a cantilever.

14. A process comprising:
forming one or more anchors on a substrate;
suspending a movable platform by one or more tether beams coupled to the one or more anchors;
coupling an actuator to the movable platform; and
coupling a micro-electro-mechanical (MEMS) probe to the movable platform, the MEMS probe having a proximal end, a distal end and a longitudinal axis extending between the proximal end and the distal end, wherein the proximal end is coupled to the movable platform and the distal end can be actuated in a direction substantially normal to a surface of the substrate.

15. The process of claim 14, further comprising supporting a media mover above the MEMS probe, wherein the media mover can move relative to the substrate in one or both of a direction substantially parallel to the longitudinal axis of the MEMS probe and a direction substantially transverse to the longitudinal axis of the MEMS probe.

16. The process of claim 14 wherein the movable platform can move in one or both of two orthogonal directions in a plane substantially parallel to the surface of the substrate.

17. The process of claim 16 wherein the movable platform can move a tip at or near the distal of the MEMS probe in a direction substantially normal to the direction of movement of the media mover.

18. The process of claim 17 wherein the movable platform can move the tip a distance approximately equal to or greater than one track spacing.

19. The process of claim 14 wherein the MEMS probe comprises a cantilever.

* * * * *